(12) United States Patent
Cnaan-On et al.

(10) Patent No.: US 12,461,191 B2
(45) Date of Patent: Nov. 4, 2025

(54) PERSON LOCATION DETERMINATION USING MULTIPATH

(71) Applicant: Koko Home, Inc., Palo Alto, CA (US)

(72) Inventors: Itay Cnaan-On, Palo Alto, CA (US); Ali Rostami, Palo Alto, CA (US); Bradley Michael Eckert, Palo Alto, CA (US); Saurabh Gupta, Palo Alto, CA (US)

(73) Assignee: Koko Home, Inc., Los Angeles, CA (US)

( * ) Notice: Subject to any disclaimer, the term of this patent is extended or adjusted under 35 U.S.C. 154(b) by 118 days.

(21) Appl. No.: 18/391,572

(22) Filed: Dec. 20, 2023

(65) Prior Publication Data

US 2024/0125889 A1 Apr. 18, 2024

Related U.S. Application Data

(63) Continuation of application No. 18/139,612, filed on Apr. 26, 2023, now Pat. No. 11,906,647.

(60) Provisional application No. 63/336,836, filed on Apr. 29, 2022.

(51) Int. Cl.
*G01S 5/02* (2010.01)
(52) U.S. Cl.
CPC .................. *G01S 5/0273* (2013.01)
(58) Field of Classification Search
CPC ........................................................ G01S 5/273
USPC ....... 342/51, 179, 357.62, 73, 352, 169, 453
See application file for complete search history.

(56) References Cited

U.S. PATENT DOCUMENTS

| | | | |
|---|---|---|---|
| 7,654,948 B2 | 2/2010 | Kaplan et al. | |
| 8,512,221 B2 | 8/2013 | Kaplan et al. | |
| 2018/0348343 A1* | 12/2018 | Achour | H01Q 1/364 |
| 2019/0108740 A1* | 4/2019 | Coke | G01S 13/89 |
| 2019/0159960 A1 | 5/2019 | Nakata et al. | |
| 2021/0396861 A1* | 12/2021 | Wellig | G06V 20/13 |

(Continued)

FOREIGN PATENT DOCUMENTS

| | | |
|---|---|---|
| CN | 113721254 A | 11/2021 |
| WO | WO-2023212037 A1 | 11/2023 |

OTHER PUBLICATIONS

"FCC Equipment Test Report of 10.525 GHz field disturbance sensor in SleepScore Max Bedside Monitor", Compliance Engineering Ireland LTD, (Sep. 20, 2013), 25 pgs.

(Continued)

*Primary Examiner* — Bo Fan
(74) *Attorney, Agent, or Firm* — Schwegman Lundberg & Woessner, P.A.

(57) ABSTRACT

In one aspect, a method of determining a location of a user within an indoor space, includes emitting a radiofrequency signal into the indoor space, receiving backscattered training radiofrequency signals, including multipath, for at least one location within the indoor space, converting the received training signals into a point cloud for each location of the at least one location, assigning a signature for each location based on the point cloud for each location, receiving additional radiofrequency signals, including multipath, converting the additional radiofrequency signals into an additional point cloud, and determining a location of the user by comparing the additional point cloud to the assigned signatures.

20 Claims, 13 Drawing Sheets

(56) References Cited

U.S. PATENT DOCUMENTS

2022/0075050 A1* 3/2022 Shouldice .............. G01S 13/56
2023/0350004 A1* 11/2023 Cnaan-On .............. G01S 13/42

OTHER PUBLICATIONS

"International Application Serial No. PCT/US2023/019957, International Search Report mailed Jul. 31, 2023", 2 pgs.

"International Application Serial No. PCT/US2023/019957, Written Opinion mailed Jul. 31, 2023", 10 pgs.

Kim, et al., "RFID-based indoor location tracking to ensure the safety of elderly in smart home environments", SpringerLink,, [Online]. Retrieved from the Internet: <URL: https://link.springer.com/article/10.1007/s00779-012-0604-4#article-info>, (2013), 8 pgs.

"International Application Serial No. PCT US2023 019957, International Preliminary Report on Patentability mailed Nov. 7, 2024", 12 pgs.

U.S. Appl. No. 18/139,612, filed Apr. 26, 2023, Person Location Determination Using Multipath.

* cited by examiner

PERSON LOCATION DETERMINATION USING MULTIPATH

CROSS REFERENCE TO RELATED APPLICATIONS

This application is a continuation of U.S. patent application Ser. No. 18/139,612, filed Apr. 26, 2023, which application claims the benefit of priority of U.S. Provisional Application Ser. No. 63/634,836 filed Apr. 29, 2022, both of which are incorporated by reference in their entireties.

TECHNICAL FIELD

This disclosure relates to radar and more specifically, but not exclusively, to using backscattered radiofrequency (RF) signals, including multipath, to determine a location of a person within a room.

BACKGROUND

Emitting RF signals within a room to identify a location of a person generates multipath in addition to directly backscattered signals from the person. Multipath is a propagation phenomenon that results in radio signals reaching the receiving antenna by two or more paths potentially causing interference and phase shifting of the signal. Typically, multipath is filtered out to prevent the interference with the backscattered signal.

BRIEF SUMMARY

A method of determining a location within an indoor space comprises: receiving training radiofrequency data emitted into the indoor space for each location with the indoor space; converting the received training data into a point cloud for each location; assigning a signature for each location based on the point cloud for each location; receiving additional radiofrequency data; converting the additional radiofrequency data into an additional point cloud; and determining a location of a user by comparing the additional point cloud to the assigned signatures.

Beyond localizing a user in a micro-location, a different method can detect a combination of user location and a specific user action that happens in that micro-location. Examples are: user rolling in the bed, user sitting on edge of bed, user locking a door, user bending to tie shoes near shoe rack. One use case for this combination of location and action, is a user entering through a doorway or user exiting through a doorway. To make the distinction, this is different from just locating a user in the area of the doorway, for example if they don't cross it, but merely step next to it. User actions are being trained in same way like micro-location but also look at the Doppler signature of the point cloud to identify the action.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
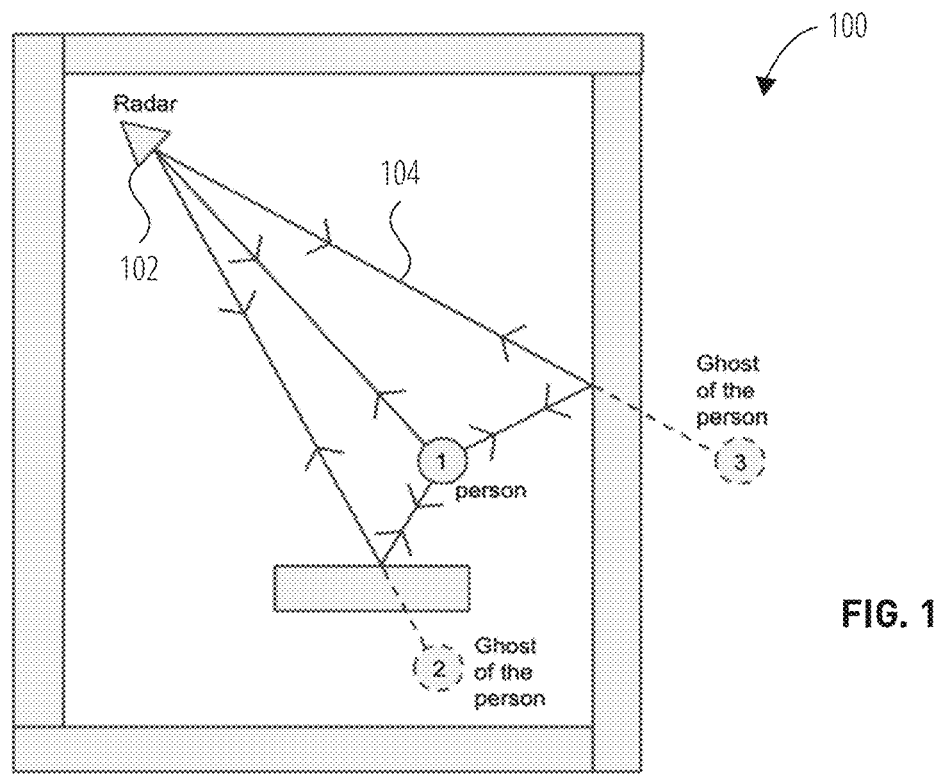
FIG. 1 illustrates an example of room multipaths.

The application of micro-locations is providing a high level, real-time mapping of the location of a plurality of persons, or pets within an indoor space. A person is mapped to a micro location within the indoor space with very high fidelity due to the leveraging of a micro-location fingerprint concept.

Sensor type and pre-processing of point cloud Examples an input from radar, lidar or sonar that gives a collection of generated points in a 2D or 3D space and other attributes such as the intensity, Doppler or spectral components. The collection of points, sometimes called "point cloud" is generated at a pre-processor using a series of processing blocks that takes the raw sensor data from the sensor and convert the data into a point cloud with a spatial 2D or 3D (array processing algorithms) parameters and other Doppler or intensity and using some filtering to limit or normalize the number of point cloud such a CFAR algorithm (Constant false alarm rate)

The concept of Fingerprinting Fingerprinting is a concept that uses the unique scattering and refraction of the sensor modality from a person or pet in an indoor environment. Radar, for example, generates a multipath, which is a series of reflections that bounces from surfaces and manifests as multiple 'ghost' copies shifted in time, angle and range and mixed together. Generally such multipath is very dominant in indoor environments where many objects and surfaces create reflection points. Traditional tracking algorithms, such as Kalman Filter and its derivatives, get many times confused with multipath as objects appear in multiple 'ghosts' and also distorts the object size and contour. With Fingerprinting, the combination of user action, such as walking, sitting down, rolling in bed or laying down, with a specific micro-location that creates a multipath signature of that location, creates a very robust fingerprint (or signature). Once a fingerprint is created through even a single observation, any future combination that resembles that fingerprint can then be compared in real-time and based on the resemblance of a fingerprint over the action duration can be identified as an activity detected in that micro-location.

A few alternatives can be used to create the fingerprint and perform the comparisons between fingerprints—such as Machine Learning classification as K-Nearest Neighbor (KNN).

Multiple micro-locations Given a single room, a few different and distinct fingerprints for a combo of micro-locations and people actions can be created. For example: the entrance area of the room as someone walks out of the room, the same entrance as someone is entering the room, a chair with someone sitting down, a bed where someone is sitting on, a bed where someone is laying down.

Multiple People and Pets

To separate between different people and pets, requires additional algorithmic work beyond the Fingerprinting. The Fingerprinting on its own can very reliably detect an activity in a micro-location, but can't separate if it is triggered by the same person or multiple people or pets. A combination of other sets of algorithms such as bounding-box adaptive filters such as Kalman filter or derivatives such as EKF, UKF with clustering such as DBSCAN can separate multiple objects and associate a specific person for example to a series of micro-locations 'activations' in a trail like of steps in time.

Micro Location and Specific User Action

A person action that includes a movement will generate by the standard radar processing a point cloud, where every point in the cloud is positioned in 3D space (X,Y,Z). Each point has a fourth dimension, Doppler shift which represents the velocity of that particular point with regards to the radar.

An action of a user spans over usually a few seconds, and such its recording of the point cloud and Doppler over that time window can be used to train and classify an action based on the cloud unique 'signature' of points distribution in 3D space and Doppler space.

FIG. 1 illustrates an example of room multipaths 100. Multipath is created when radar illumination has multiple bounces before reach back to a radar. Seeing the same object (person) and its "ghosts" impacts the ability to localize a person precisely. Multipath is a dominating phenomenon in an indoor environment, such as the room illustrated in FIG. 1, and can vary widely with even a few inches of movement of the person. In FIG. 1, a radar 102 receives multipaths 104 from a person 1 and ghosts of the person 2 and 3, which may be caused by signal reflections from furniture, such as nightstands and dressers, and walls, etc. As will be discussed further below, a system incorporating the radar 102 treats the multipath as a source of information rather than noise to be removed. A 3D physical machine learning model captures the salient nature of the multipaths 104 with respect to localization. Micro-locations 3D 'bubbles' (point clouds) in the room are mapped to the multipath space and are assigned a "fingerprint" (also referred to as signature) that can be used to identify that particular micro-location and optionally activity in that micro-location.

Figure 2:
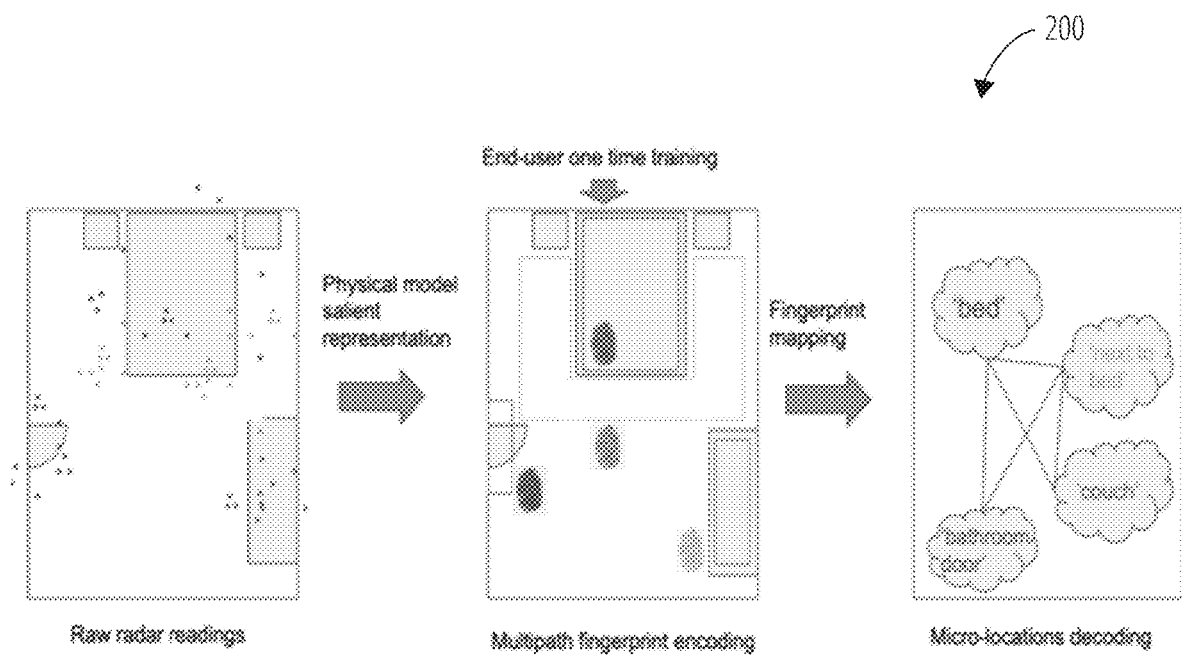
FIG. 2 illustrates an example of micro-locations contextual tracking.

FIG. 2 illustrates an example of micro-locations contextual tracking 200. The machine learning architecture uses all received signals, including multipath signals, to track micro-location 3D bubbles (point cloud) within a room (e.g., bedroom) and optionally person movement therein. Raw radar readings (including multipath) at designated locations are used for multipath fingerprint encoding, which can then be used for later location determination of the person.

Figure 3:
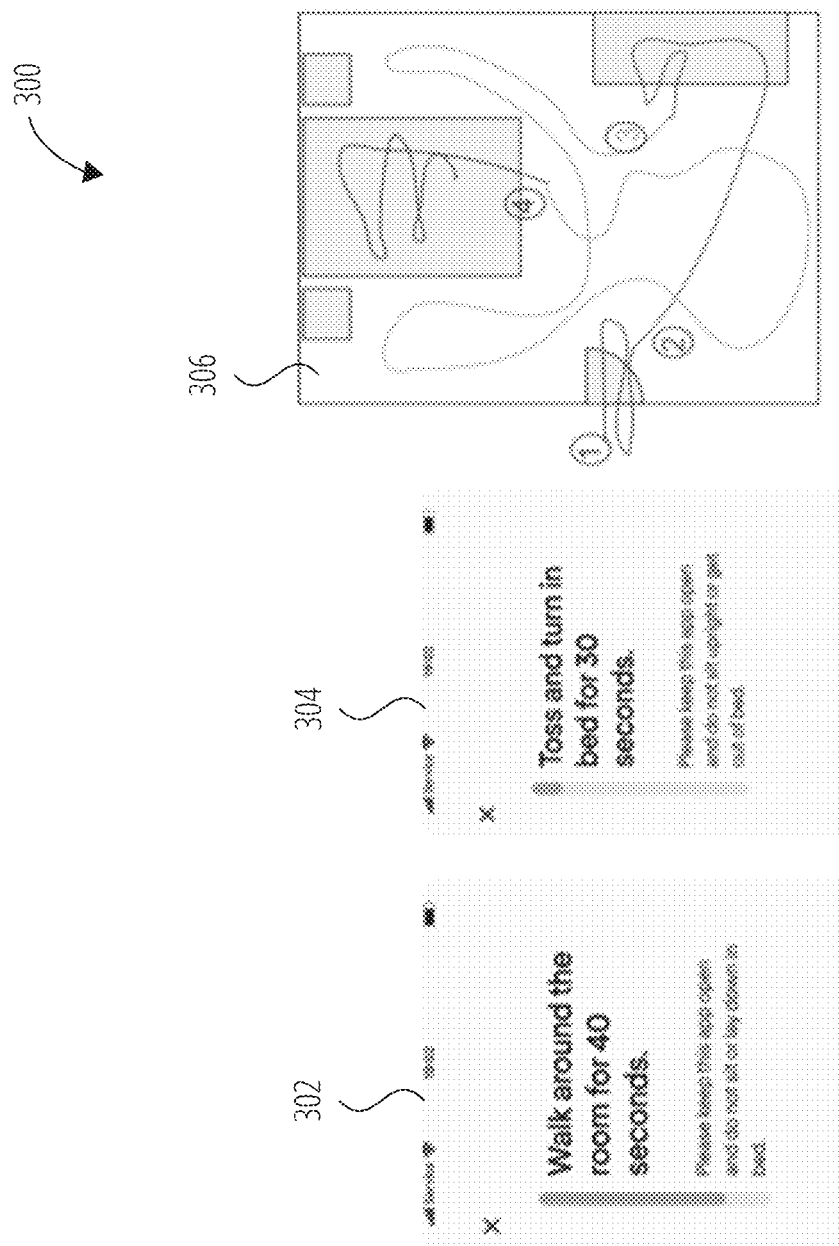
FIG. 3 illustrates an example of micro-locations model training.

FIG. 3 illustrates an example of micro-locations model training 300. Training can be explicit and guided during initial deployment by the user. A training session uses a few seconds of moving between the micro-locations, e.g., in bed, near side and far side of bed, etc. as indicated by the example graphical user interfaces 302 and 304 and shown by paths 306. Once training is completed, a machine learning model is generated and ready for use. Retraining may be needed if the device and/or furniture is moved. Alternatively, explicit training can be replaced with unsupervised training over time based on backscattered radar data.

Figure 4:
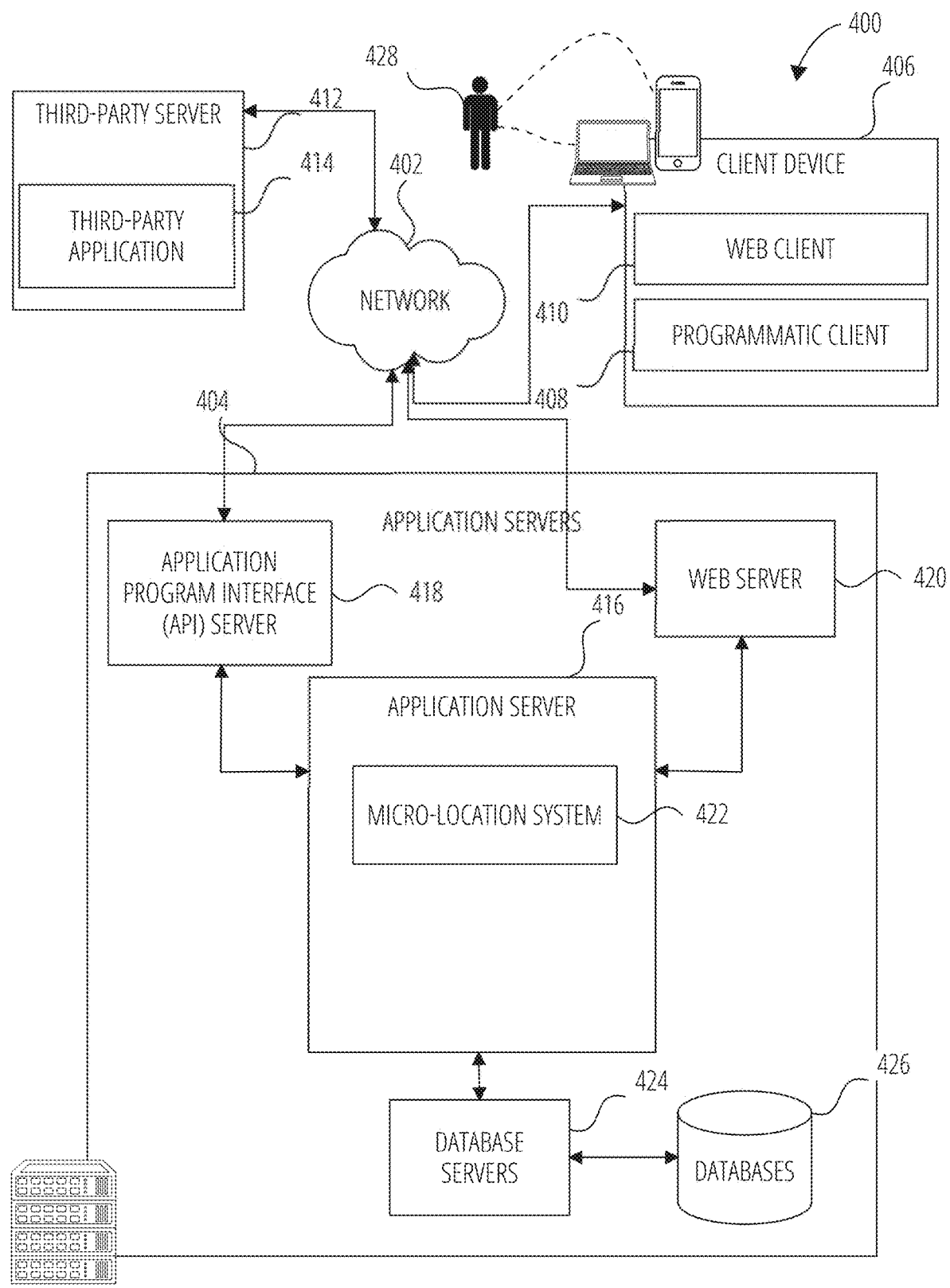
FIG. 4 is a diagrammatic representation of a networked environment in which the present disclosure may be deployed, in accordance with some examples.

FIG. 4 is a diagrammatic representation of a networked computing environment 400 in which some examples of the present disclosure may be implemented or deployed.

One or more application servers 404 provide server-side functionality via a network 402 to a networked user device, in the form of a client device 406 that is accessed by a user 428. A web client 410 (e.g., a browser) and a programmatic client 408 (e.g., an "app") are hosted and executed on the web client 410.

An Application Program Interface (API) server 418 and a web server 420 provide respective programmatic and web interfaces to application servers 404. A specific application server 416 hosts a Micro-location system 422, which includes components, modules and/or applications. The micro-location system 422 may reside on the application server 416, the third-party server 412, and/or the client device 406 in its entirety or in a distributed form.

The web client 410 communicates with the Micro-location system 422 via the web interface supported by the web server 420. Similarly, the programmatic client 408 communicates with the Micro-location system 422 via the programmatic interface provided by the Application Program Interface (API) server 418.

The application server 416 is communicatively coupled to database servers 424, facilitating access to an information storage repository or databases 426. In some examples, the databases 426 includes storage devices that store information to be published and/or processed by the Micro-location system 422.

Additionally, a third-party application 414 executing on a third-party server 412, has programmatic access to the application server 416 via the programmatic interface provided by the Application Program Interface (API) server 418. For example, the third-party application 414, using information retrieved from the application server 416, may support one or more features or functions on a website hosted by a third party.

Figure 5:
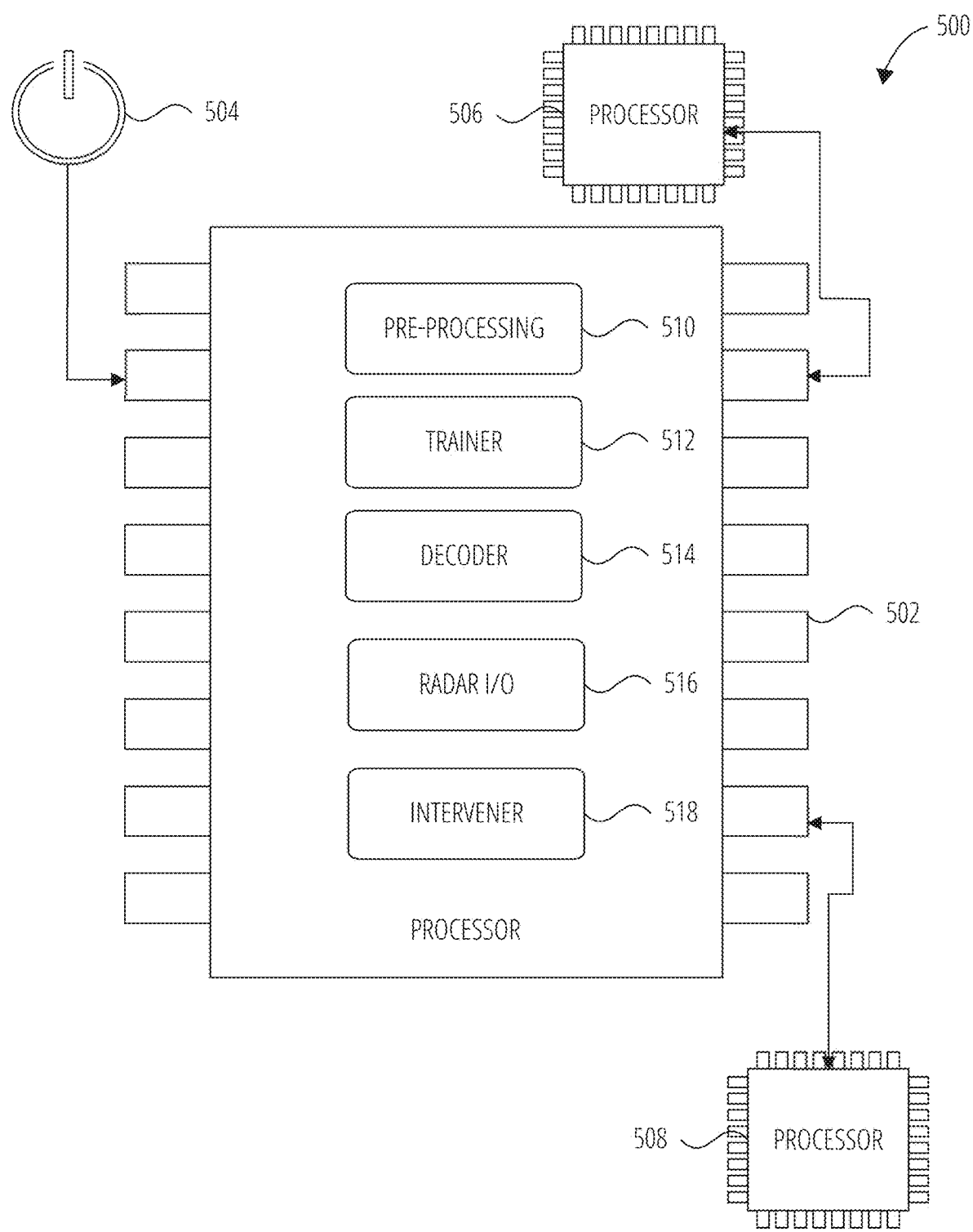
FIG. 5 is a diagrammatic representation of a processing environment, in accordance with some examples.

Turning now to FIG. 5, a diagrammatic representation of a processing environment 500 is shown, which includes the processor 506, the Processor 508, and a Processor 502 (e.g., a GPU, CPU, or combination thereof).

The Processor 502 is shown to be coupled to a power source 504, and to include (either permanently configured or temporarily instantiated) modules, namely a pre-processing 510, a trainer 512, a decoder 514, a radar I/O 516 module, and an intervener 518. The pre-processing 510, as discussed further below, takes raw radar sensor data from the environmental components 734 and converts the data in a point cloud with 2D or 3D parameters. The trainer 512, as discussed further below, trains the Micro-location system 422 to recognize locations and optionally actions of a person within an indoor space. The decoder 514, as discussed further below, decodes the point cloud into a determination of a location of a person and optionally actions based on the training. The radar I/O 516 interacts with the environmental components 734 (e.g., radar) to cause the environmental components 734 to emit a radiofrequency signal and receive backscattered signals (including multipath) for analysis by the above modules. The intervener 518, based on a determined micro-location (e.g., bed) and optionally in conjunction with other data, such as vitals that may also be determined with radar, may make an aural recommendation to the person to improve sleep (e.g., avoid watching TV in bed) and/or make a physical intervention (e.g., adjust lighting, heating, window shades, white noise, music, etc.).

Figure 6:
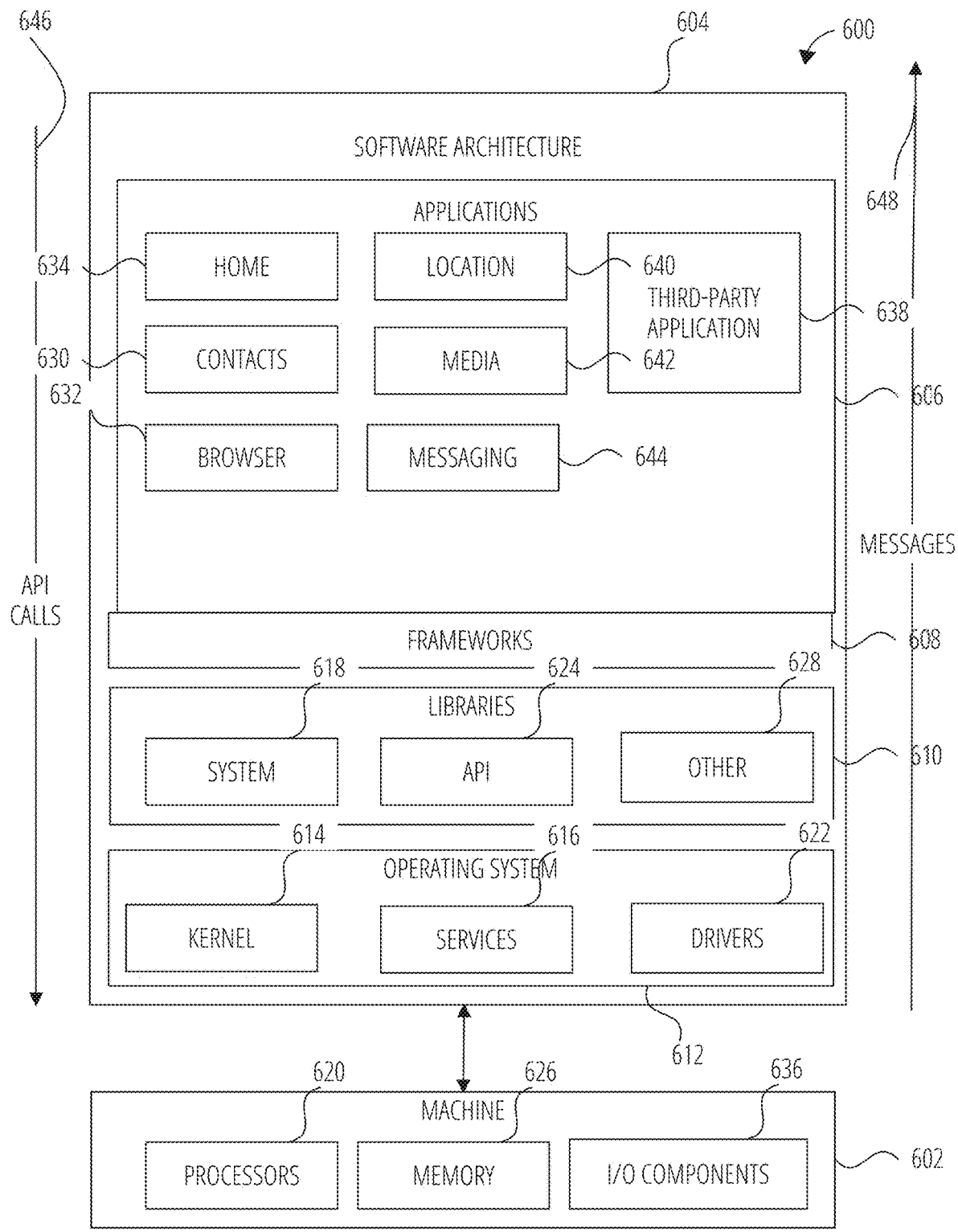
FIG. 6 is a block diagram showing a software architecture within which the present disclosure may be implemented, according to some examples.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 636. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 646 through the software stack and receive messages 648 in response to the API calls 646.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, Processor management (e.g., scheduling), component management, networking, and security settings, among other functionalities. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, and power management drivers.

The libraries 610 provide a low-level common infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., Web Kit to provide web browsing functionality), and the like. The libraries 610 can also include a wide variety of other libraries 628 to provide many other APIs to the applications 606.

The frameworks 608 provide a high-level common infrastructure used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In some examples, the applications 606 may include a home application 634, a contacts application 630, a browser application 632, a location application 640, a media application 642, a messaging application 644, and a broad assortment of other applications such as a third-party application 638. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party application 638 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 638 can invoke the API calls 646 provided by the operating system 612 to facilitate functionality described herein.

Figure 7:
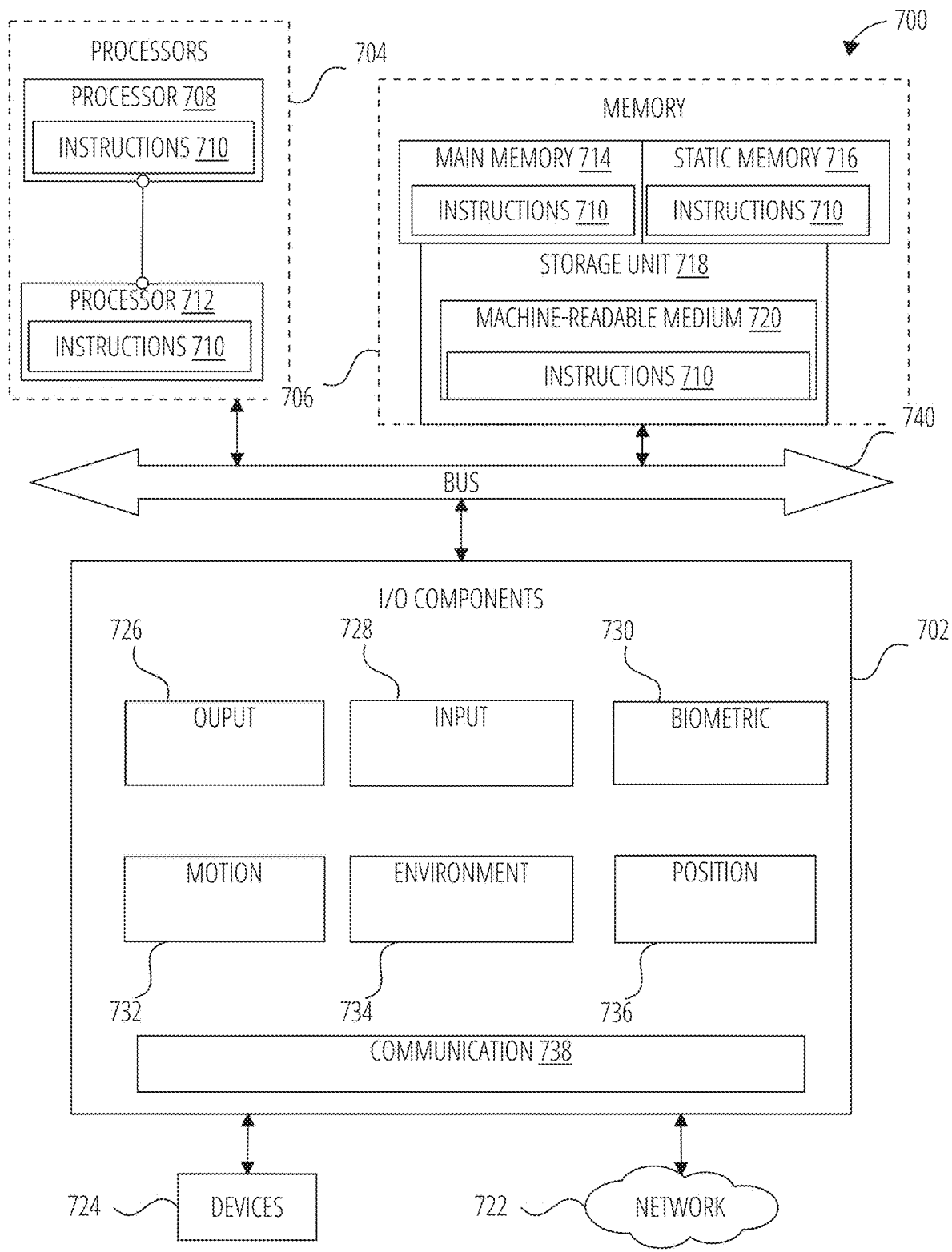
FIG. 7 is a diagrammatic representation of a machine in the form of a computer system within which a set of instructions may be executed for causing the machine to perform any one or more of the methodologies discussed herein, in accordance with some examples.

FIG. 7 is a diagrammatic representation of the machine 700 within which instructions 710 (e.g., software, a program, an application, an applet, an app, or other executable code) for causing the machine 700 to perform any one or more of the methodologies discussed herein may be executed. For example, the instructions 710 may cause the machine 700 to execute any one or more of the methods described herein. The instructions 710 transform the general, non-programmed machine 700 into a particular machine 700 programmed to carry out the described and illustrated functions in the manner described. The machine 700 may operate as a standalone device or be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while a single machine 700 is illustrated, the term "machine" may include a collection of machines that individually or jointly execute the instructions 710 to perform any one or more of the methodologies discussed herein.

The machine 700 may include processors 704, memory 706, and I/O components 702, which may be configured to communicate via a bus 740. In some examples, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another Processor, or any suitable combination thereof) may include, for example, a Processor 708 and a Processor 712 that execute the instructions 710. The term "Processor" is intended to include multi-core processors that may comprise two or more independent processors (sometimes referred to as "cores") that may execute instructions contemporaneously. Although FIG. 7 shows multiple processors 704, the machine 700 may include a single processor with a single core, a single processor with multiple cores (e.g., a multi-core processor), multiple processors with a single core, multiple processors with multiples cores, or any combination thereof.

The memory 706 includes a main memory 714, a static memory 716, and a storage unit 718, both accessible to the processors 704 via the bus 740. The main memory 706, the static memory 716, and storage unit 718 store the instructions 710 embodying any one or more of the methodologies or functions described herein. The instructions 710 may also reside, wholly or partially, within the main memory 714, within the static memory 716, within machine-readable medium 720 within the storage unit 718, within the processors 704 (e.g., within the processor's cache memory), or any suitable combination thereof, during execution thereof by the machine 700.

The I/O components 702 may include various components to receive input, provide output, produce output, transmit information, exchange information, or capture measurements. The specific I/O components 702 included in a particular machine depend on the type of machine. For example, portable machines such as mobile phones may include a touch input device or other such input mechanisms, while a headless server machine will likely not include such a touch input device. The I/O components 702 may include many other components not shown in FIG. 7. In various examples, the I/O components 702 may include output components 726 and input components 728. The output components 726 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), or other signal generators. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 702 may include biometric components 730, motion components 732, environmental components 734, or position components 736, among a wide array of other components. For example, the biometric components 730 include components to detect expressions (e.g., hand expressions, facial expressions, vocal expressions, body gestures, or eye-tracking), measure biosignals (e.g., blood pressure, heart rate, body temperature, perspiration, or brain waves), or identify a person (e.g., voice identification, retinal identification, facial identification, fingerprint identification, or electroencephalogram-based identification). The motion components 732 include acceleration sensor components (e.g., accelerometer), gravitation sensor components, rotation sensor components (e.g., gyroscope). The environmental components 734 include, for example, one or more cameras, illumination sensor components (e.g., photometer), temperature sensor components (e.g., one or more thermometers that detect ambient temperature), radar, humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), radar, sonar, or other components that may provide indications, measurements, or signals corresponding to a surrounding physical environment. The position components 736 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 702 further include communication components 738 operable to couple the machine 700 to a network 722 or devices 724 via respective coupling or connections. For example, the communication components 738 may include a network interface Component or another suitable device to interface with the network 722. In further examples, the communication components 738 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 724 may be another machine or any of a wide variety of peripheral devices (e.g., a peripheral device coupled via a USB).

Moreover, the communication components 738 may detect identifiers or include components operable to detect identifiers. For example, the communication components 738 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Data glyph, Maxi Code, PDF417, Ultra Code, UCC RSS-2D bar code, and other optical codes), or acoustic detection components (e.g., microphones to identify tagged audio signals). In addition, a variety of information may be derived via the communication components 738, such as location via Internet Protocol (IP) geolocation, location via Wi-Fi® signal triangulation, or location via detecting an NFC beacon signal that may indicate a particular location.

The various memories (e.g., main memory 714, static memory 716, and/or memory of the processors 704) and/or storage unit 718 may store one or more sets of instructions and data structures (e.g., software) embodying or used by any one or more of the methodologies or functions described herein. These instructions (e.g., the instructions 710), when executed by processors 704, cause various operations to implement the disclosed examples.

The instructions 710 may be transmitted or received over the network 722, using a transmission medium, via a network interface device (e.g., a network interface component included in the communication components 738) and using any one of several well-known transfer protocols (e.g., hypertext transfer protocol (HTTP)). Similarly, the instructions 710 may be transmitted or received using a transmission medium via a coupling (e.g., a peer-to-peer coupling) to the devices 724.

Figure 8:
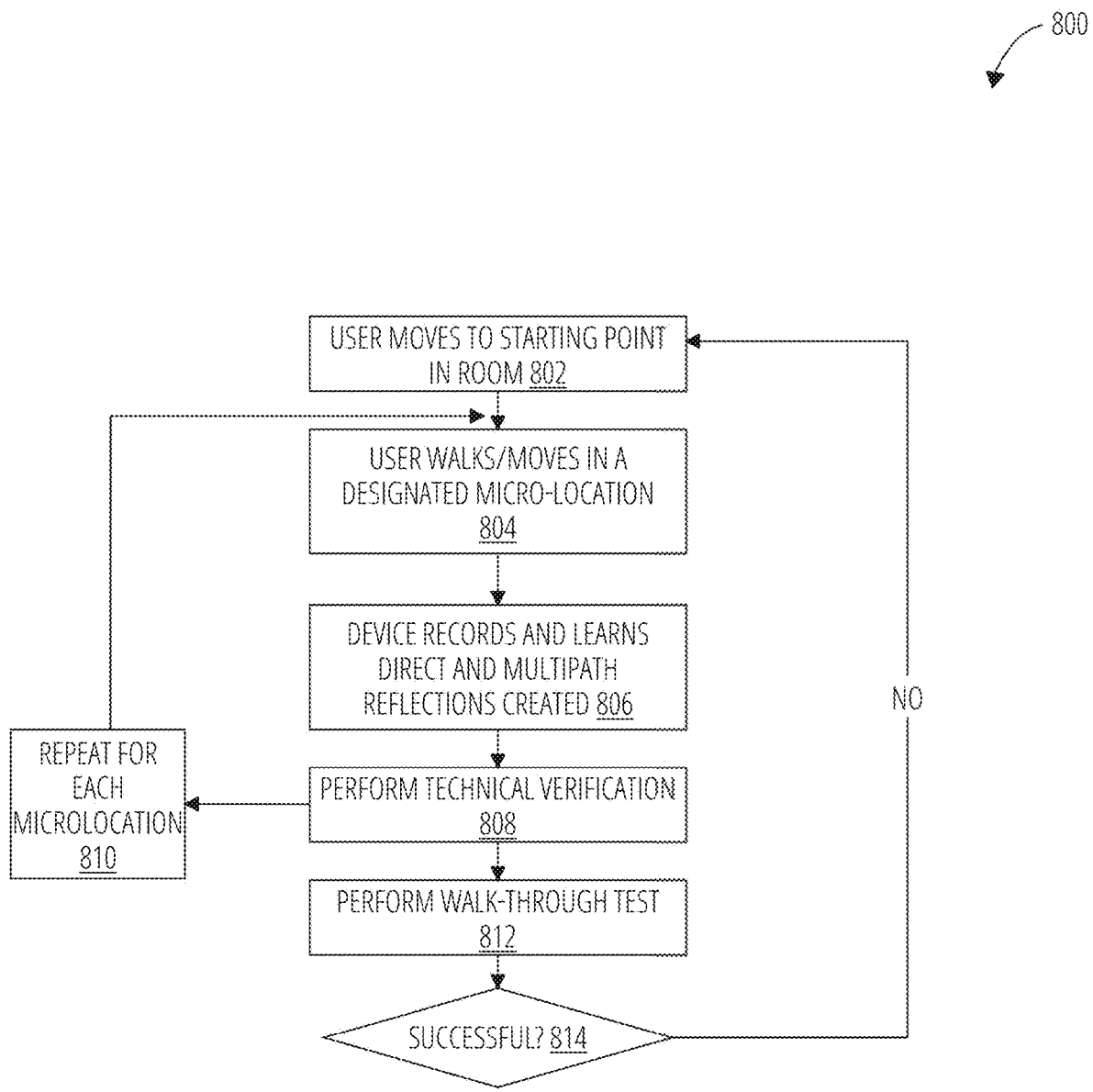
FIG. 8 illustrates a method of training in accordance with some examples.

FIG. 8 illustrates a method of training in accordance with some examples. Although the example method 800 depicts a particular sequence of operations, the sequence may be altered without departing from the scope of the present disclosure. For example, some of the operations depicted may be performed in parallel or in a different sequence that does not materially affect the function of the method 800. In other examples, different components of an example device or system that implements the method 800 may perform functions at substantially the same time or in a specific sequence.

According to some examples, the method includes the user moving to starting point in room at block 802. The user then walks/moves in a designated micro-location at block 804. The micro-location system 422 then records and learns direct and multipath reflections created at block 806 from radiofrequency (RF) signals it emitted. The micro-location system 422 performs technical verification at block 808. Block 804 to block 808 are then repeated for each micro-location within the room. The person can then perform a walk-through test at block 812. And, at decision block 814, if successful the method 800 ends. Otherwise, the method 800 repeats from block 802.

The method 800 enables a calibration process using fingerprinting of a point cloud of backscattered radar images of a person including multipath. The multipath generates ghost images of the person that are unique. Block 808 can include removing outliers indicating too much movement or variation in height. The training at block 806 can be performed locally at the device emitting the radiofrequency signals and/or elsewhere (e.g., in a remote server or cloud). The repeating at block 810 can include bed sides (near and far), on the bed, and other areas of a bedroom for example.

Figure 9:
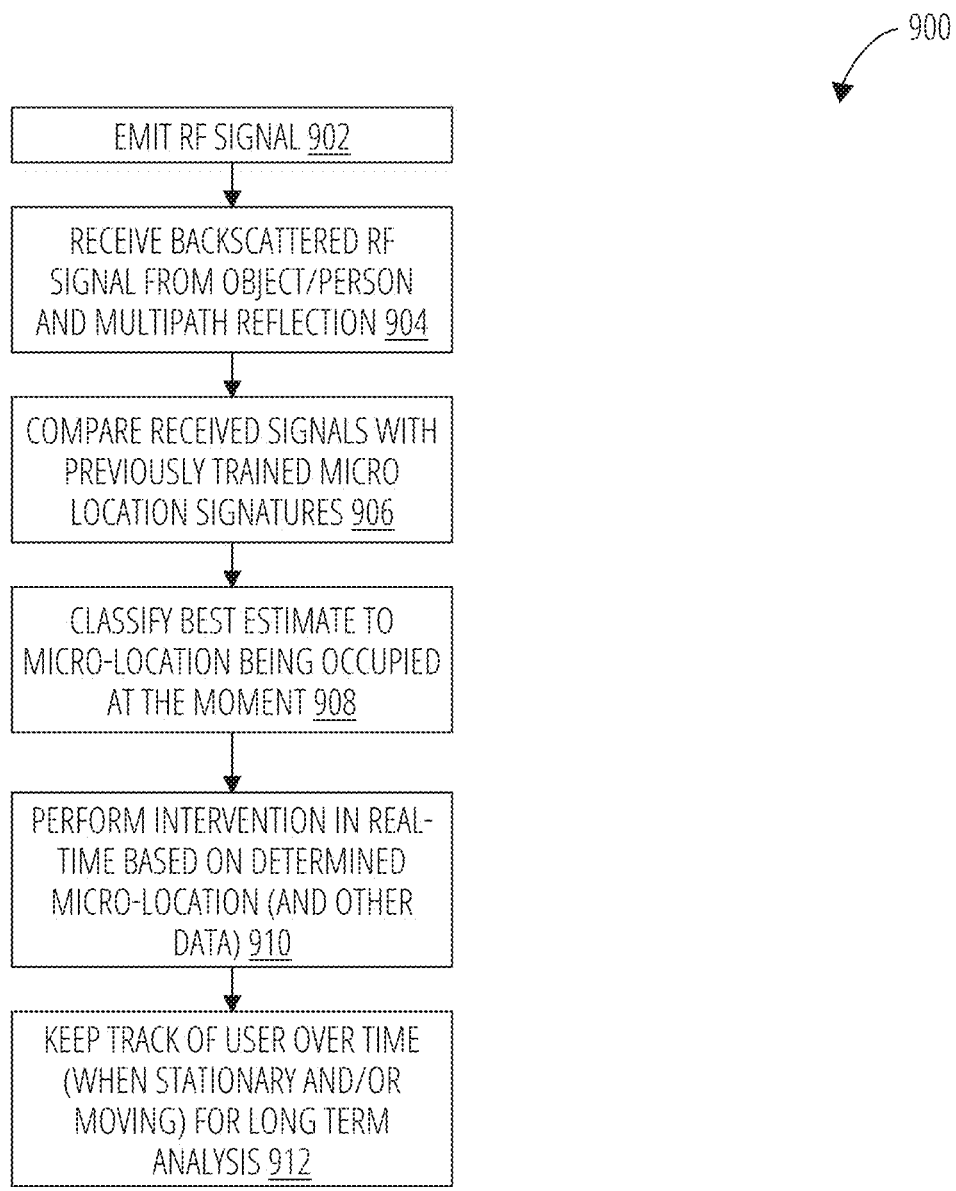
FIG. 9 illustrates a method of inference processing in accordance with some examples.

FIG. 9 illustrates a method of inference processing 900 in accordance with some examples. Although the example method 900 depicts a particular sequence of operations, the sequence may be altered without departing from the scope of the present disclosure. For example, some of the operations depicted may be performed in parallel or in a different sequence that does not materially affect the function of the method 900. In other examples, different components of an example device or system that implements the method 900 may perform functions at substantially the same time or in a specific sequence.

According to some examples, the method 800 includes emitting RF signals at block 902; receiving backscattered RF signal from object/person and multipath reflections at block 904; comparing received signals with previously trained micro location signatures at block 906; classifying best estimate to micro-location being occupied at the moment at block 908 (e.g., based on the training using a machine learning algorithm, e.g., KNN); performing intervention in real-time based on determined micro-location (and other data) at block 910; and keeping track of the user over time (when stationary and/or moving) for long term analysis at block 912. Blocks 902 through 910 can be repeated multiple times per second as change of user usage of micro-locations occur.

In an example, intervention can include cognitive behavioral therapy (CBT) and/or modifying environmental conditions. Further, the radar used can detect motions that are generated during sleep, such as tossing and turning. In an example, radar can also sense vital signs like respiration rate and heart rate. Combining the pattern of toss and turn, different breathing and heart beat patterns and/or micro-location can enable monitoring the user's sleep and determine the appropriate intervention to improve a user's sleep.

Additionally, the method 900 can combine results from passive sensors, such as a thermometer, UV, photo diode, among others, to find correlation between certain sleep pattern and the environmental conditions. In an example, the method 900 can also use the sleep monitor soft sensor to learn about day/night reversal of sleep, and the associated environmental condition by looking at different passive sensors. In an example, the techniques can be valuable in providing feedback to improve the human target's sleep. For example, the technique can determine or learn that certain environmental condition results in better sleep and prescribe that to improve future sleep.

Figure 10:
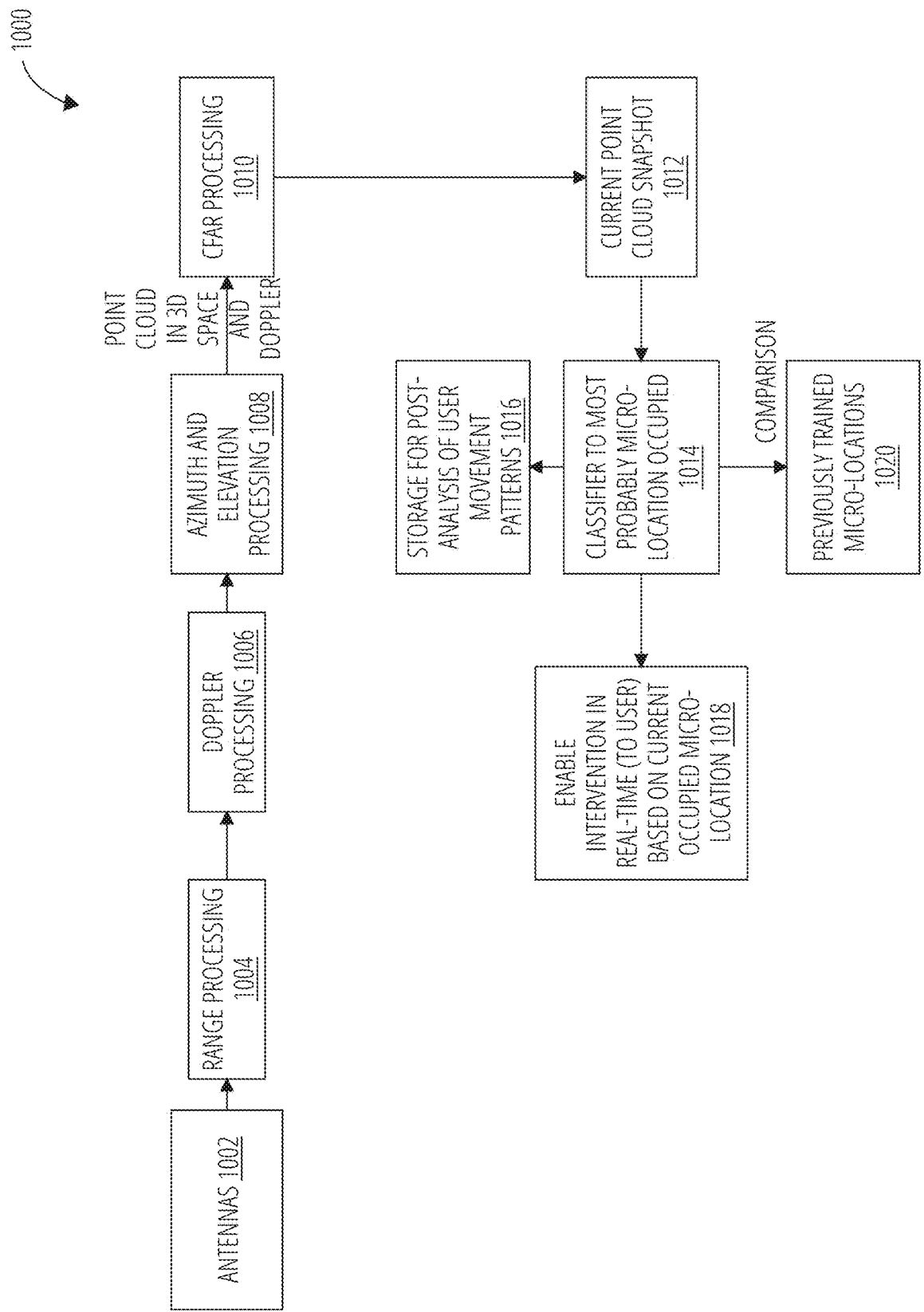
FIG. 10 illustrates a radar processing pipeline in accordance with some examples.

FIG. 10 illustrates a radar processing pipeline 1000 in accordance with some examples. The antennas 1002 emit radiofrequency radiation (e.g., radar signals) and receive backscattered radiation from a person in a room, including multipaths 104. Note that the antennas 1002 can both emit and receive signals or a subset can emit while another subset can receive. Range processing 1004 then performs a Fast Fourier Transform (FFT) on received signals to get distance. Additional FFTs provide angle so that X, Y coordinates can be generated. Optional doppler processing 1006 can also be performed. Azimuth and elevation processing 1008 then generates a point cloud in 3D space, which is fed into Constant false alarm rate (CFAR) processing 1010 along with optional doppler data for noise filtering to provide a current point cloud snapshot 1012. A trained machine learning model, e.g., a classifier using KNN, then interprets the current point cloud snapshot 1012 with previously trained micro-locations 1020 to determine the most probable micro-location occupied at 1014. The determination can then be passed to storage for post-analysis of user movement patterns 1016 and enable intervention in real-time (to user) based on current occupied micro-location 1018 as described previously.

Figure 11:
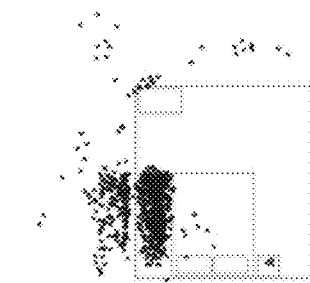
FIG. 11 illustrates example micro-locations within a bedroom.
Figure 11:
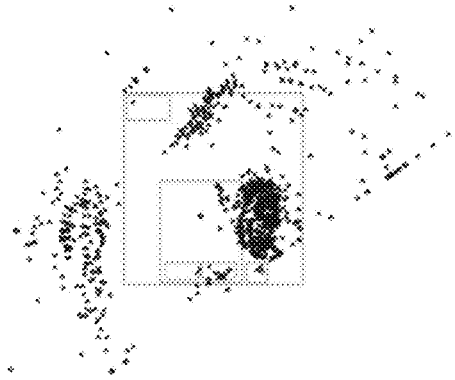
Figure 11:
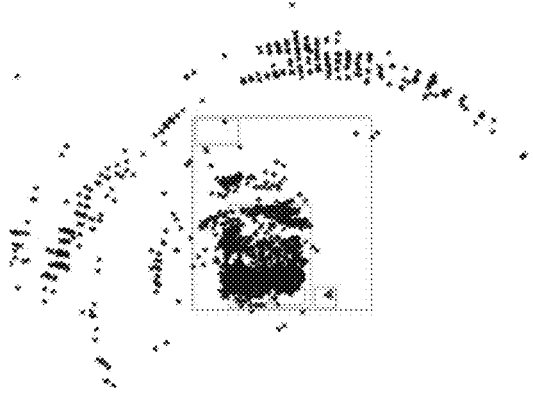

FIG. 11 illustrates example micro-locations 1100 within a bedroom and associated current point cloud snapshots 1012. Micro-locations includes on bed, near side of bed and far side of bed. Other micro-locations can include other locations within the room, such as adjacent a dresser or door, etc.

Figure 12:
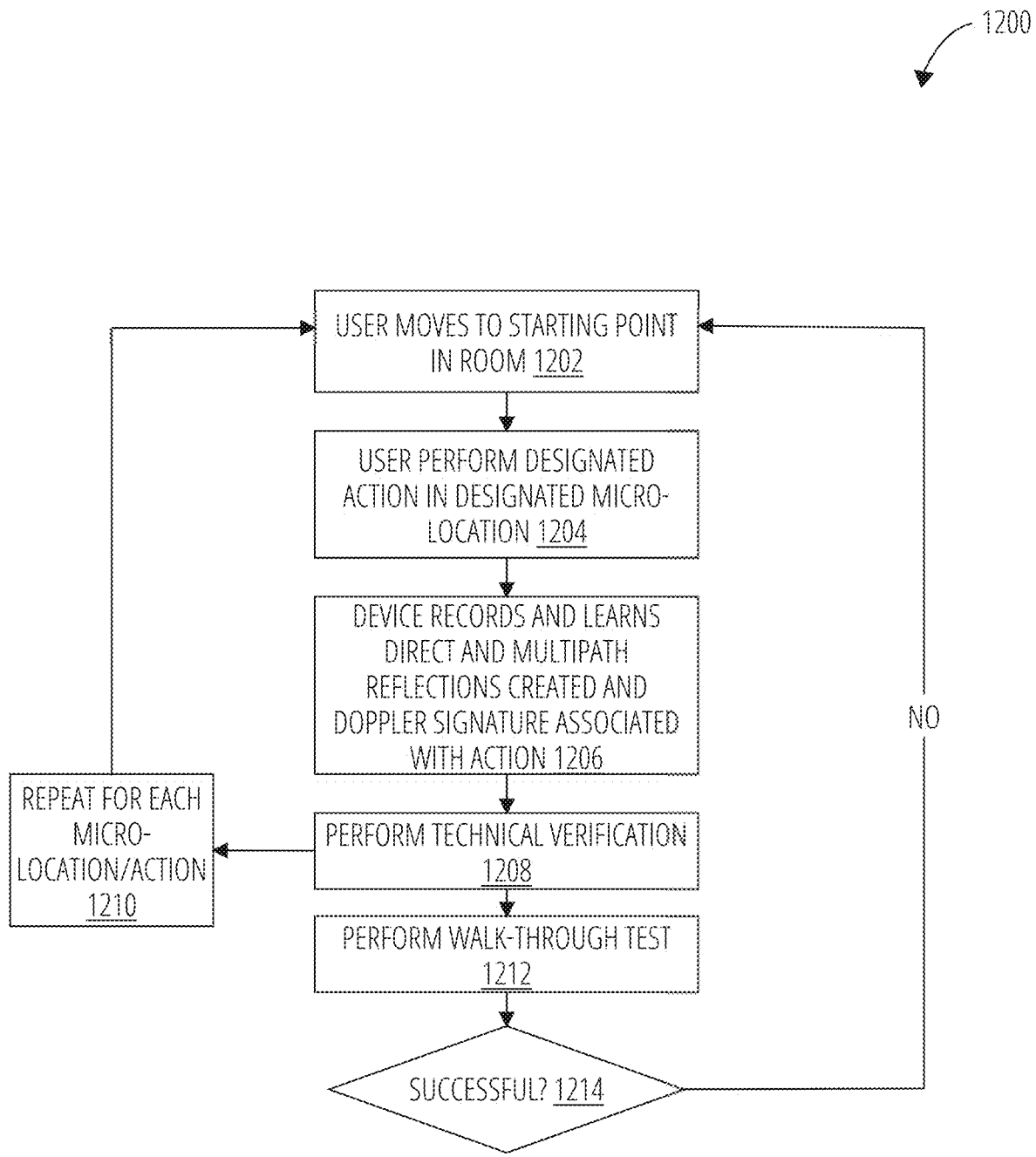
FIG. 12 illustrates a method of training in accordance with some examples.

FIG. 12 illustrates a method 1200 of training in accordance with some examples. Although the example method 1200 depicts a particular sequence of operations, the sequence may be altered without departing from the scope of the present disclosure. For example, some of the operations depicted may be performed in parallel or in a different sequence that does not materially affect the function of the method 1200. In other examples, different components of an example device or system that implements the method 1200 may perform functions at substantially the same time or in a specific sequence.

Initially, the user moves to starting point in room at block 1202; the user then performs designated action in designated micro-location at block 1204 per, for example, GUI 302 or GUI 304. The device then records and learns direct and multipath reflections created and doppler signature associated with action at block 1206. Next, the device performs technical verification at block 1208. repeats block 1202 to block 1208 for each micro-location/action at block 1210. Next, a walk-through test is performed at block 1212 and if not successful, the method repeats at block 1214.

Figure 13:
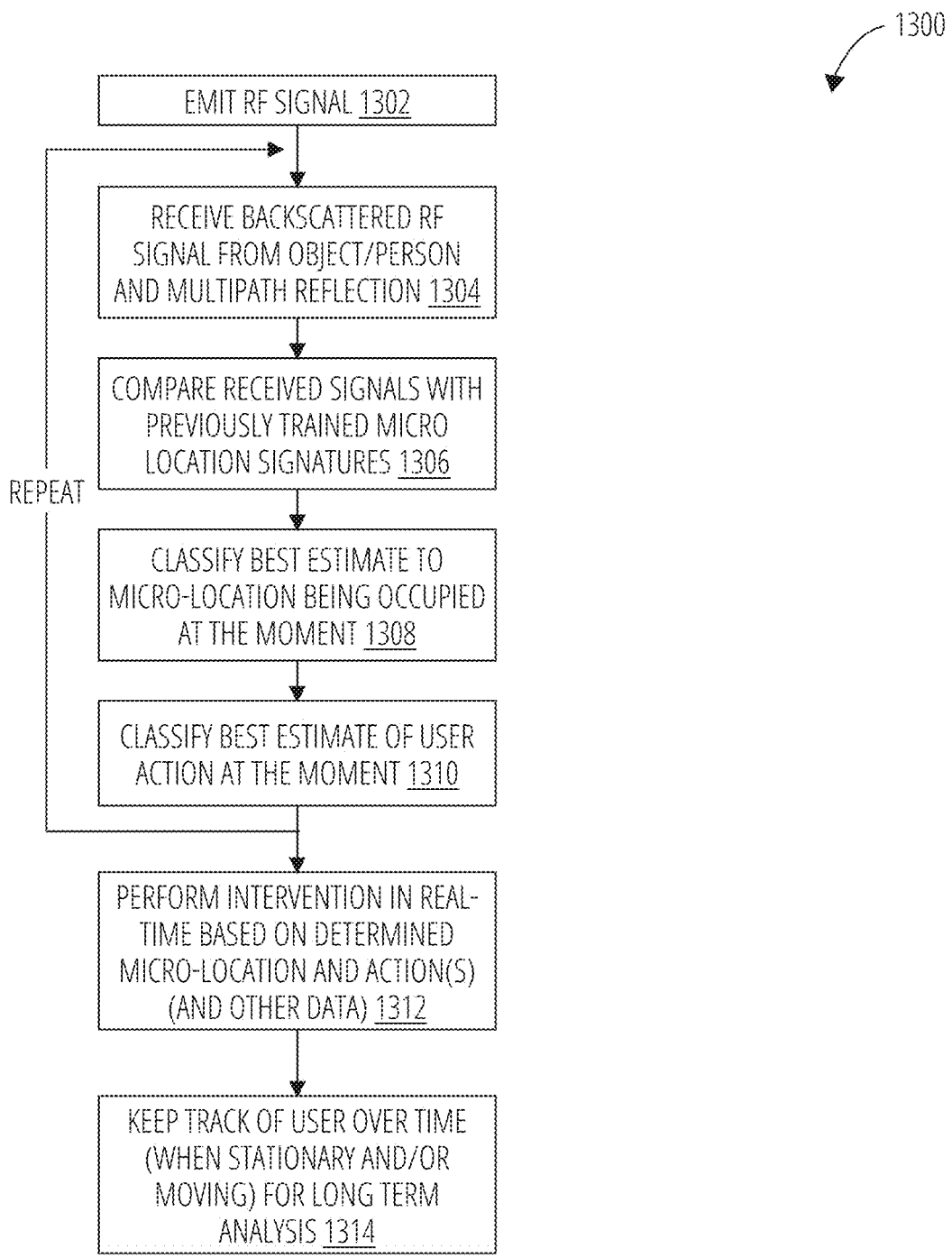
FIG. 13 illustrates a method of inference processing in accordance with some examples.

FIG. 13 illustrates a method 1300 of inference processing in accordance with some examples. Although the example method 1300 depicts a particular sequence of operations, the sequence may be altered without departing from the scope of the present disclosure. For example, some of the operations depicted may be performed in parallel or in a different sequence that does not materially affect the function of the method 1300. In other examples, different components of an example device or system that implements the method 1300 may perform functions at substantially the same time or in a specific sequence.

Initially, an RF signal (radar) is emitted at block 1302. Next, the method 1300 includes receiving backscattered RF signal from object/person and multipath reflection at block 1304, which are then compared with previously trained micro location signatures at block 1306 using a trained machine learning model. The trained machine learning model then classifies a best estimate to micro-location being occupied at the moment at block 1308 and best estimate of user action at the moment at block 1310. Intervention in real-time based on determined micro-location and action(s), (and other data) at block 1312 as described previously. In addition, if a detected action includes falling, the intervention can include contacting a third person (e.g., family member, emergency services, etc.). The method 1300 may also include keeping track of the user over time (when stationary and/or moving) for long term analysis at block 1314.

Figure 14:
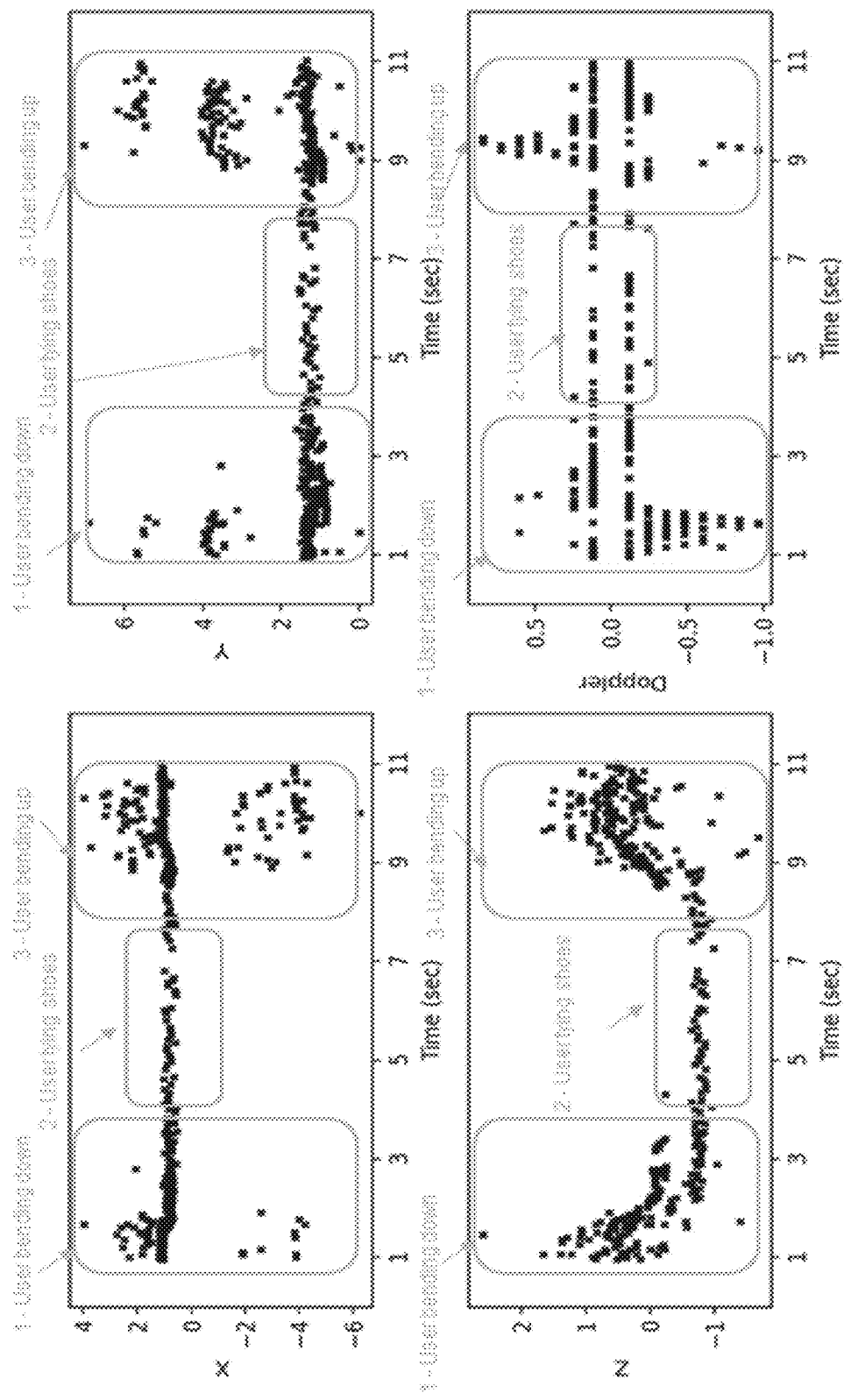
FIG. 14 illustrates an aspect of the subject matter in accordance with one embodiment.

FIG. 14 is an example of a user tying their shoes next to the bed edge. An evolution of the 3 dimension space (X,Y,Z) is depicted as is the Doppler evolution (also called micro-Doppler). Action can be seen transitioning between 3 steps: 1—bending down, 2—tying shoes, 3—bending up. The Z-axis shows clearly down then up movement and how Doppler shows negative Doppler (movement towards radar), then positive Doppler (movement away from radar).

In view of the disclosure above, various examples are set forth below. It should be noted that one or more features of an example, taken in isolation or combination, should be considered within the disclosure of this application.

1. A method of determining a location of a user within an indoor space, comprising:
    emitting a radiofrequency signal into the indoor space;
    receiving backscattered training radiofrequency signals, including multipath, for at least one location within the indoor space;
    converting the received training signals into a point cloud (e.g., cluster of points with outstanding reflection) for each location of the at least one location;
    assigning a signature for each location based on the point cloud for each location;
    receiving additional radiofrequency signals, including multipath;
    converting the additional radiofrequency signals into an additional point cloud; and
    determining a location of the user by comparing the additional point cloud to the assigned signatures.
2. The method of claim 1, wherein the assigning a signature includes training a machine learning model with the point cloud and wherein the determining the location is performed by the trained machine learning model.
3. The method of example 2, wherein the machine learning model incorporates a k-nearest neighbors algorithm, a support vector machine algorithm, naive bayes algorithm or a similar classification method for matching additional point cloud to the recorded training signature for each location.
4. The method of any of the preceding examples, further comprising receiving training doppler data as the user performs an action and assigning a doppler signature associated with the user action.
5. The method of any of the preceding examples, further comprising receiving additional doppler data in conjunction with the additional radiofrequency signals to determine a current user action.
6. The method of any of the preceding examples, performing an intervention based on the determined location and the determined current user action.
7. The method of any of the preceding examples, wherein the determined current user action includes falling.
8. The method of any of the preceding examples, further comprising determining at least one vital sign from the additional radiofrequency signals and performing an intervention based on the determined location and the determined at least one vital sign.
9. The method of any of the preceding examples, wherein the intervention includes providing feedback to a user to improve sleep.
10. A non-transitory computer readable medium having stored thereon instructions to cause to a computer to execute a method, the method comprising:
    receiving backscattered training radiofrequency data, including multipath, for at least one location within the indoor space;
    converting the received training data into a point cloud for each location of the at least one location; assigning a signature for each location based on the point cloud for each location;
    receiving additional radiofrequency data, including multipath;
    converting the additional radiofrequency data into an additional point cloud; and
    determining a location of a user by comparing the additional point cloud to the assigned signatures.
11. A system, comprising:
    at least one processor;
    at least one antenna configured to emit a radiofrequency signal into an indoor space; a non-transitory memory storing instructions that cause one or more processors of the at least one processor to execute a method comprising:
    receiving backscattered training radiofrequency data, including multipath, for at least one location within the indoor space;
    converting the received training data into a point cloud for each location of the at least one location; assigning a signature for each location based on the point cloud for each location;
    receiving additional radiofrequency data, including multipath;
    converting the additional radiofrequency data into an additional point cloud; and determining a location of a user by comparing the additional point cloud to the assigned signatures.
12. The system of example 11, wherein the assigning a signature includes training a machine learning model with the point cloud and wherein the determining the location is performed by the trained machine learning model.
13. The system of any of the preceding examples, wherein the machine learning model incorporates a k-nearest neighbors algorithm, a support vector machine algorithm, naive bayes algorithm or a similar classification methods.
14. The system of any of the preceding examples, wherein the method further includes receiving training doppler data as the user performs an action and assigning a doppler signature associated with the user action.

15. The system of any of the preceding examples, wherein the method further includes receiving additional doppler data in conjunction with the additional radiofrequency signals to determine a current user action.
16. The system of any of the preceding examples, wherein the method further comprises performing an intervention based on the determined location and the determined current user action.
17. The system of any of the preceding examples, wherein the determined current user action includes falling.
18. The system of any of the preceding examples, wherein the method further comprises determining at least one vital sign from the additional radiofrequency signals and performing an intervention based on the determined location and the determined at least one vital sign.
19. The system of any of the preceding examples, wherein the intervention includes providing feedback to the user to improve sleep.
20. The system of any of the preceding examples, wherein the method further comprises performing analysis of user movement patterns over a predetermined time based on the determined locations over the predetermined time.

Glossary

"Carrier Signal" refers to any intangible medium capable of storing, encoding, or carrying instructions for execution by the machine, and includes digital or analog communications signals or other intangible media to facilitate communication of such instructions. Instructions may be transmitted or received over a network using a transmission medium via a network interface device.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner In examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. A decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method described herein may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In some examples, the processors or processor-implemented components may be distributed across a number of geographic locations.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine-Storage Medium" refers to a single or multiple storage devices and/or media (e.g., a centralized or distributed database, and/or associated caches and servers) that store executable instructions, routines and/or data. The term includes solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium", "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Module" refers to logic having boundaries defined by function or subroutine calls, branch points, Application Program Interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information). The various operations of example methods and routines described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Signal Medium" refers to any intangible medium that is capable of storing, encoding, or carrying the instructions for execution by a machine and includes digital or analog communications signals or other intangible media to facilitate communication of software or data. The term "signal medium" may o include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method of determining a location of a user within an indoor space, comprising:
   emitting a radiofrequency signal into the indoor space;
   receiving backscattered training radiofrequency signals, including multipath, for at least one location within the indoor space;
   assigning a signature for each location of the at least one location based on the received backscattered training radiofrequency signals;
   receiving additional radiofrequency signals, including multipath; and
   determining a location of the user by comparing the additional radiofrequency signals to the assigned signatures.

2. The method of claim 1, wherein the assigning a signature includes training a machine learning model with the backscattered training radiofrequency signals and wherein the determining the location is performed by the trained machine learning model.

3. The method of claim 2, wherein the machine learning model incorporates a k-nearest neighbors algorithm, a support vector machine algorithm, or naive bayes algorithm for matching the additional radiofrequency signals to the assigned training signature for each location.

4. The method of claim 1, further comprising receiving training doppler data as the user performs an action and assigning a doppler signature associated with the user action.

5. The method of claim 4, further comprising receiving additional doppler data in conjunction with the additional radiofrequency signals to determine a current user action.

6. The method of claim 5, performing an intervention based on the determined location and the determined current user action.

7. The method of claim 6, wherein the determined current user action includes falling.

8. The method of claim 1, further comprising determining at least one vital sign from the additional radiofrequency signals and performing an intervention based on the determined location and the determined at least one vital sign.

9. The method of claim 8, wherein the intervention includes providing feedback to a user to improve sleep.

10. A non-transitory computer readable medium having stored thereon instructions to cause to a computer to execute a method, the method comprising:
    emitting a radiofrequency signal into an indoor space;
    receiving backscattered training radiofrequency signals, including multipath, for at least one location within the indoor space;
    assigning a signature for each location of the at least one location based on the received backscattered training radiofrequency signals;
    receiving additional radiofrequency signals, including multipath; and determining a location of a user by comparing the additional radiofrequency signals to the assigned signatures.

11. A system, comprising:
at least one processor;
at least one antenna configured to emit a radiofrequency signal into an indoor space;
a non-transitory memory storing instructions that cause one or more processors of the at least one processor to execute a method comprising:
emitting a radiofrequency signal into the indoor space;
receiving backscattered training radiofrequency signals, including multipath, for at least one location within the indoor space;
assigning a signature for each location of the at least one location based on the received backscattered training radiofrequency signals;
receiving additional radiofrequency signals, including multipath; and
determining a location of a user by comparing the additional radiofrequency signals to the assigned signatures.

12. The system of claim 11, wherein the assigning a signature includes training a machine learning model with the backscattered training radiofrequency signals and wherein the determining the location is performed by the trained machine learning model.

13. The system of claim 12, wherein the machine learning model incorporates a k-nearest neighbors algorithm, a support vector machine algorithm, or naive bayes algorithm.

14. The system of claim 11, wherein the method further includes receiving training doppler data as the user performs an action and assigning a doppler signature associated with the user action.

15. The system of claim 14, wherein the method further includes receiving additional doppler data in conjunction with the additional radiofrequency signals to determine a current user action.

16. The system of claim 15, wherein the method further comprises performing an intervention based on the determined location and the determined current user action.

17. The system of claim 16, wherein the determined current user action includes falling.

18. The system of claim 11, wherein the method further comprises determining at least one vital sign from the additional radiofrequency signals and performing an intervention based on the determined location and the determined at least one vital sign.

19. The system of claim 18, wherein the intervention includes providing feedback to the user to improve sleep.

20. The system of claim 11, wherein the method further comprises performing analysis of user movement patterns over a predetermined time based on the determined locations over the predetermined time.

* * * * *